United States Patent [19]

Grogan

[11] Patent Number: 5,214,967
[45] Date of Patent: Jun. 1, 1993

[54] CYLINDRICAL PIEZOELECTRIC LOAD SENSOR

[75] Inventor: Richard J. Grogan, Toledo, Ohio

[73] Assignee: Helm Instrument Co., Inc., Maumee, Ohio

[21] Appl. No.: 666,660

[22] Filed: Mar. 8, 1991

[51] Int. Cl.$^5$ ............................................ G01L 1/16
[52] U.S. Cl. ............................ 73/862.542; 73/862.68; 73/862.642; 73/DIG. 4
[58] Field of Search .......... 73/730, 862.54, DIG. 4, 73/783, 862.64, 862.06, 862.68, 862.542, 862.642; 310/338, 369; 338/229

[56] References Cited

U.S. PATENT DOCUMENTS

| | | | |
|---|---|---|---|
| 2,799,788 | 7/1957 | Fitzgerald et al. | 310/338 |
| 2,898,761 | 8/1959 | Hast | 73/783 |
| 2,925,576 | 2/1960 | Wakeland et al. | 338/229 |
| 3,210,993 | 10/1965 | Shoor et al. | 73/862.64 |
| 3,297,971 | 1/1967 | Gindes | 338/5 |
| 3,388,590 | 6/1968 | Dryden | 73/771 |
| 3,389,459 | 6/1968 | Russell | 29/621.1 |
| 3,444,390 | 5/1969 | Breidenbach et al. | 307/116 |
| 3,501,654 | 3/1970 | Humphries | 310/338 X |
| 3,741,231 | 5/1988 | Patterson et al. | 73/862.06 X |
| 3,742,757 | 7/1973 | Callahan | 73/767 |
| 4,135,109 | 1/1979 | Gingerich et al. | 310/369 |
| 4,135,392 | 1/1979 | Young | 73/862.65 |
| 4,156,863 | 5/1979 | Madison et al. | 367/165 |
| 4,171,646 | 10/1979 | Dybel et al. | 73/808 |
| 4,199,978 | 4/1980 | von Knorring et al. | 73/862.38 |
| 4,200,855 | 4/1980 | Gilcher | 338/5 |
| 4,203,318 | 5/1980 | Yorgiadis | 73/862.65 |
| 4,246,783 | 1/1981 | Steven et al. | 73/161 |
| 4,280,363 | 7/1981 | Johansson | 73/768 |
| 4,342,233 | 8/1982 | Edmondson et al. | 73/862.06 |
| 4,412,456 | 11/1983 | Wilhelm et al. | 73/862.65 |
| 4,416,163 | 11/1983 | Yorgiadis | 73/862.65 |
| 4,429,579 | 2/1984 | Wilhelm | 73/768 |
| 4,526,044 | 7/1985 | Moser et al. | 73/862.06 |
| 4,590,400 | 5/1986 | Shukla et al. | 310/338 |
| 4,621,519 | 11/1986 | Phillips | 310/338 X |
| 4,767,960 | 8/1988 | Strobel | 310/338 |
| 4,775,816 | 10/1988 | White et al. | 310/338 |
| 4,794,295 | 12/1988 | Penneck et al. | 310/338 X |
| 4,809,244 | 2/1989 | Penneck et al. | 367/162 |
| 4,813,278 | 3/1989 | Kosugi | 73/783 |
| 4,854,174 | 8/1989 | Keith | 73/714 |
| 4,964,091 | 10/1990 | Cook | 367/165 |

Primary Examiner—Herbert Goldstein
Assistant Examiner—Elizabeth L. Shopbell
Attorney, Agent, or Firm—William J. Clemens

[57] ABSTRACT

An apparatus for measuring force applied to a blank resting on a tool supported by a tool holder includes a tubular piezoelectric body having a central aperture extending between a first end and a second end of the body, a plurality of legs attached to an outer surface of the body and each having a free end extending beyond the first end of the body, and an elongated tube extending through the central aperture of the body, a first end of the tube terminating between the first end of the body and the free ends of the legs. Indica are provided on an outer surface of the tube for indicating the position of the body in a cavity formed in a tool holder. An electrical cable has a pair of conductors electrically connected to the body for generating a sensor output signal. Potting compound is forced through an interior of the tube to encapsulate the legs, the body, the first end of the tube and the cable to retain the apparatus in the cavity.

15 Claims, 1 Drawing Sheet

U.S. Patent
June 1, 1993
5,214,967
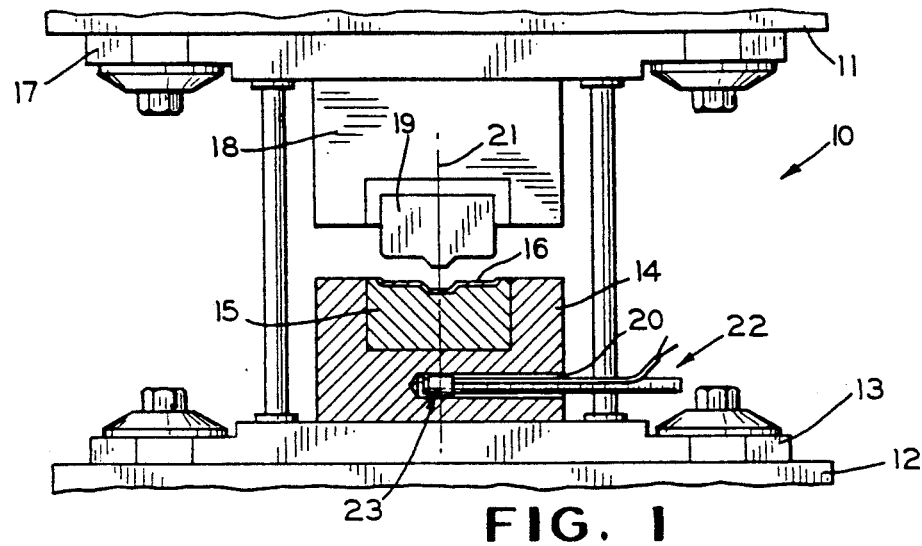
FIG. 1
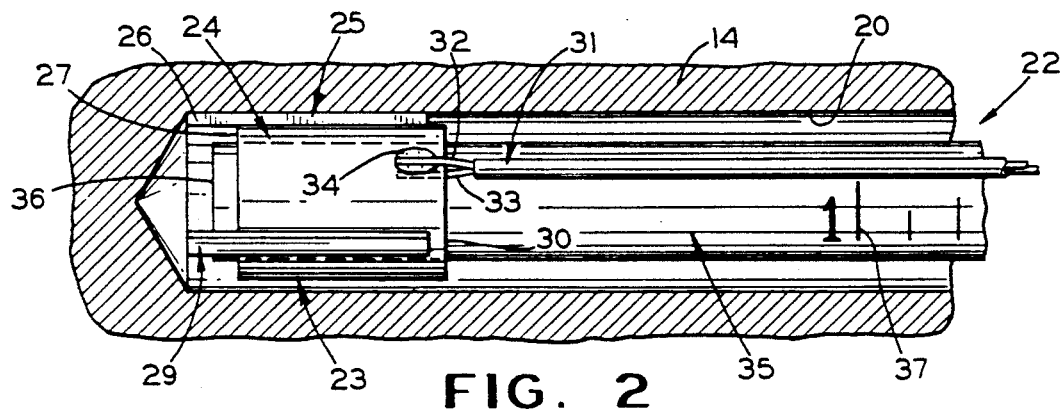
FIG. 2
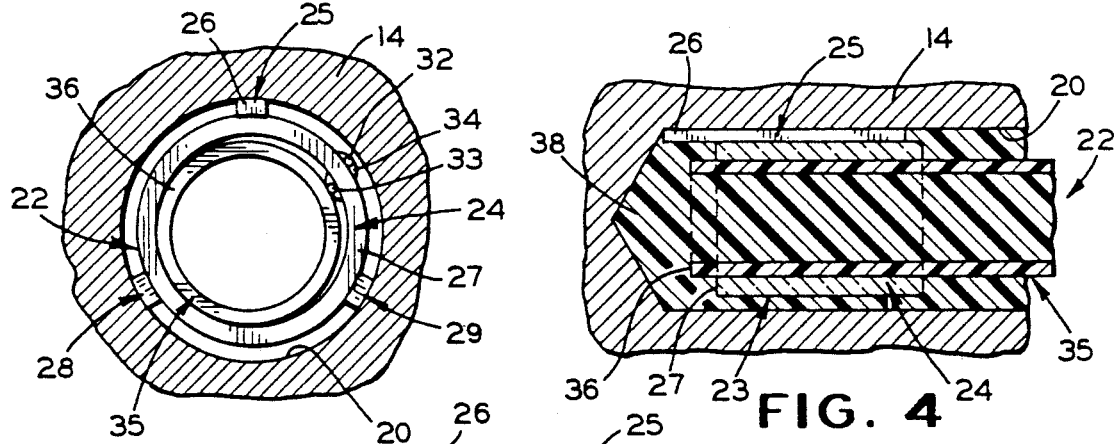
FIG. 3
FIG. 4
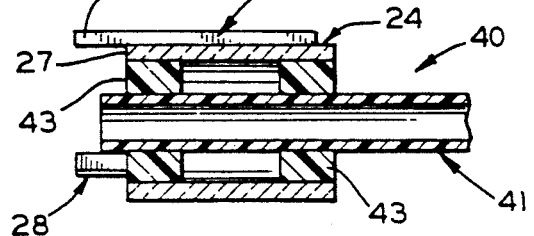
FIG. 5

CYLINDRICAL PIEZOELECTRIC LOAD SENSOR

BACKGROUND OF THE INVENTION

The present invention relates generally to force sensitive transducers and, in particular, to an apparatus for measuring the work forces present in a machine tool.

The ability to measure force or load is a vital part of many industrial processes. Recognizing that a structure undergoes dimensional changes when subjected to a load, the measure of the dimensional change in a structure can accurately indicate the amount of force applied thereto. Such measurement is made through the use of a wire, foil, or semi-conductor element intimately bonded to the structure. By measuring the change in the electrical resistance of the element, which resistance is a function of the change in cross section of the element due to alterations in the dimensions of a structure, it is possible to accurately measure the load applied to the structure.

Many transducer devices have been developed for attachment to structures for measuring the amount of stress applied thereto. U.S. Pat. No. 3,444,390 and U.S. Pat. No. 4,171,646 both disclose measuring devices for use on machine tools such as forges, presses and the like. Generally, prior art devices are not sufficiently sensitive or physically constructed to be readily adaptable for use in working areas of a machine near the tool in order to directly measure forces on the tool. For example, the transducer arrangements disclosed in the above-mentioned patents are incapable of directly measuring the working load on a tool. This inability to directly measure tool loading is a particularly acute problem when it is desired to monitor the individual loads on a plurality of tools carried on a common base and caused to do work simultaneously.

Ideally, the apparatus for measuring the work forces in a machine tool is mounted in an area of the machine which is shielded to protect the apparatus from physical damage resulting from inadvertent impact or from contamination by debris or lubricants. It also desirable that the load measuring apparatus be readily accessible for inspection, removable, and repair or maintenance.

U.S. Pat. No. 4,412,456 and U.S. Pat. No. 4,526,044 both disclose load sensing probes for disposition in a cavity in a back-up member arranged to support a tool at a working station for measuring the strain associated with working forces applied to the tool. Each probe has an elongate configuration which allows it to be mounted at a point remote from its load sensing end and enables it to be conveniently used with a plurality of similar probes in relatively confined spaces. A split plug includes a slot defining two sensing arms, which arms are pushed outwardly into engagement with the inner wall of an accommodating cavity formed in a back-up member of the machine tool. The probe is sensitive to relative closing movement of the cavity caused by compressive strain in the back-up member.

Each of the probes includes a split plug portion having an enlarged head, a cylindrical shoulder, an elongate stem, and a disc-shaped sensing member. A plurality of conventional strain gauges are mounted on the sensing member to detect compressive strain. A central aperture extends through the longitudinal axis of the split plug. A slot is formed in the sensing member and a portion of the stem defines two moveable sensing arms. A split plug pin having an outwardly tapered end portion is longitudinally inserted through the aperture into threaded cooperation with a nut. Upon tightening the nut, the threaded end of the pin is drawn upwardly within the split plug, causing the sensing arms to be pushed outwardly into frictional engagement with the inside wall of the accompanying cavity until a desired predetermined level of preloading is reached. Tool working forces result in relative closing movement of the cavity, which movement causes dimensional changes in the sensing member which can be measured by the strain gauges.

Each of the above-described probes is selective in its sensitivity so that it can be employed in a face plate at a discreet point in a limited area as compared to the total projected area of the face plate. Accordingly, several similar probes, one for each tool station, can be utilized in a single face plate supporting a plurality of spaced tools.

SUMMARY OF THE INVENTION

The present invention concerns an apparatus for sensing force applied to a blank resting on a tool supported by a tool holder in a press. The force sensing apparatus includes a tubular piezoelectric body having a central aperture extending between opposite ends of the body, spacer means such as legs attached to an outer surface of the body and having one end extending beyond one end of the body, and an elongated tube extending through the central aperture of the body, one end of the tube terminating between the one end of the body and the one end of the spacer means. Indicating means are attached to an outer surface of the tube for indicating the position of the one end of the spacer means relative to the location of indicia on the indicating means thereby enabling precise location of the apparatus in an cavity formed in a machine tooling holder. An electrical conductor is connected to the body for transmitting an electrical signal representing the force sensed by the body. When the apparatus has been located in the cavity, a potting compound is injected through the tube to the one end of the tube whereby the potting compound encapsulates the spacer means, the body, the tube and the electrical conductor. The body will respond to force applied to a blank on a tool supported by the associated tooling holder to generate a force signal on the electrical conductor.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a front elevational view of a press in partial cross section including a load sensing apparatus in accordance with the present invention;

FIG. 2 is an enlarged fragmentary elevational view of the load sensing apparatus shown in FIG. 1;

FIG. 3 is an enlarged fragmentary end view of the load sensing apparatus shown in the FIG. 1;

FIG. 4 is an elevational view similar to the FIG. 2 with the load sensing apparatus shown in cross section; and FIG. 5 is a cross sectional view of an alternate embodiment of the load sensing apparatus shown in the FIGS. 1-4.

DESCRIPTION OF THE PREFERRED EMBODIMENT

There is shown in the FIG. 1 a typical press 10 having a slide 11 moveable in a vertical direction with respect to a bed 12 typically supported by a building floor. Mounted on an upper surface of the bed 12 is a lower die shoe 13. Attached to an upper surface of the lower die shoe 13 is lower tooling holder 14. Located in an upwardly facing cavity formed in an upper surface of the lower tooling holder 14 is a lower tooling portion 15. An upper surface of the lower tooling portion 15 is contoured for shaping a blank 16 which rests thereon.

Attached to a lower surface of the slide 11 is an upper die shoe 17. Attached to a lower surface of the upper die shoe 17 is an upper tooling holder 18 having a downwardly facing cavity formed therein for retaining an upper tooling portion 19. A lower face of the upper tooling portion 19 is contoured to cooperate with the facing upper surface of the lower tooling portion 15 to form the blank 16 into the desired shape upon contact by the opposed tooling portions.

Formed in the lower tooling holder 14 is a generally horizontally extending aperture or cavity 20 which extends from a side surface of the lower tooling holder 14 to a position on a vertically extending centerline 21 of the tooling portions 15 and 19. A load sensing apparatus such as a probe 22 constructed in accordance with the present invention is inserted into the cavity 20 and has a sensing tip 23 positioned at the centerline 21 for sensing the force applied to the blank 16 through the tooling portions 15 and 19.

As shown in the FIGS. 2-4, the probe 22 includes a generally tubular sensing body 24 formed from a piezoelectric material and including a central aperture extending between opposite ends of the body. Attached to an outer surface of the tubular body 24 is a spacer means including at least one leg 25 having one end 26 extending a predetermined distance beyond an adjacent one end 27 of the tubular body 24. As best shown in the FIG. 3, the leg 25 is one of three such legs, including the legs 28 and 29, spaced equally about the outer circumference of the tubular body 24 for spacing the body 24 from the inner wall of the aperture or cavity 20. The legs 25, 28 and 29 can be of any suitable cross-sectional shape. As illustrated, the legs 25, 28 and 29 have an arcuate cross section which conforms to the curvature of the outer surface of the tubular body 24. The legs 25, 28 and 29 can be attached to the outer surface of the tubular body 24 by any suitable means such as an adhesive (not shown).

At an end 30, opposite the one end 27 of the tubular body 24, an electrical cable 31 is attached to the tubular body 24. The cable 31 has a pair of conductors 32 and 33 with the conductor 32 electrically connected to an outer surface of the tubular body 24 by any suitable means such as solder 34. The conductor 33 is electrically connected to an inner surface of the tubular body 24 in a similar manner.

An elongated tube 35 is formed of an insulating material such as a plastic and has one end 36 which extends coaxially through an interior of the tubular body 24. The one end 36 of the elongated tube 35 is positioned between the one end 27 of the tubular body 24 and the one end 26 of the leg 25. The tube 35 can have indicia located on an outer surface thereof. An indicating means such as an indicator 37 represents a distance from that location to an end of the probe 22 can be applied directly to an outer surface of the tube 35. Any other suitable form of indicating means providing indicia can be employed such as a printed decal adhered to the outer surface of the tube 35 and including the indicator 37. The indicator 37 is utilized to position the tubular body 24 in the cavity 20 with respect to the centerline 21 of the tooling. Thus, the indicator 37 could represent the distance to any suitable reference such as the center of the body 24 or the end 26 of the leg 27. Although not shown, suitable means can be employed to locate the cable 31 against the outer surface of the tube 35. For example, shrink tubing or electrical tape can be applied over the conductors 32 and 33 to perform the functions of electrically insulating the conductors and retaining the end of the cable 31 in place.

Once the probe 22 has been positioned in the cavity 20, a suitable potting compound 38 can be forced into the open end of the tube 35 which extends from the cavity. The potting compound 38 will flow down the tube 35 and exit at the one end 36. The spacing of the one end 36 of the tube 35 with respect to the one end 27 of the tubular body 24 and the one 26 of the leg 25 assures that the potting compound will freely flow into the end of the cavity 20 and before forced in a reverse direction between the inner wall of the cavity 20 and an outer surface of the tubular body 24 to completely fill the cavity 20 as shown in the FIG. 4. Not only does the potting compound 38 insulate the tubular body 24 from the inner wall of the cavity 20, but it also retains the probe 22 at the desired location in the cavity 20. After the potting compound 38 has set, that portion of the tube 35 extending from the cavity 20 can be cut off if so desired.

In the FIG. 5, there is shown an alternate embodiment of the probe in accordance with the present invention. A probe 40 includes the previously described tubular body 24 and attachment means such as the legs 25 and 28 together with the leg 29 (not shown). An elongated tube 41, having a smaller diameter than the previously described elongated tube 35, has one end 42 which extends coaxially through a central opening in the tubular body 24 and terminates between the one end 26 of the leg 25 and the one end 27 of the tubular body 24. The elongated tube 41 is attached to the tubular body 24 by suitable means such as an insulating material 43. The material 43 can completely fill the void between an outer wall of the tube 41 and an inner wall of the body 24 or simply be provided at opposite ends of the body 24 as shown in the FIG. 5. In a manner similar to that described with respect to the probe 22, a potting compound can be utilized to fix the probe 40 in the cavity 20.

When the probe 22 or 40 has been installed in the cavity 22 and the potting material 38 has set, the force or load applied to the blank 16 can be accurately measured. As stated above, when the slide 11 of the press 10 is lowered such that the upper tooling portion 19 contacts the blank 16, pressure is applied through the lower tooling portion 15 to the lower tooling holder 14 which causes the lower tooling holder 14 and the cavity 20 to deform. Such deformation causes the tubular body 24 to deform producing a change in electrical potential between the conductors 32 and 33. This change in electrical potential is generated as a sensor output signal on the cable 31 which signal can be utilized to drive conventional monitoring equipment to generate a display, alarm, etc. The sensing tip 23 of the probe 22 is safely enclosed by the potting compound 38 and protected in the interior of the tooling holder 14 against misalignment and/or damage.

In summary, the apparatus 22 for measuring force applied to a metalworking tool holder in accordance with the present invention includes a tubular body 24 formed entirely of a piezoelectric material, the body having a sensing end 27 and an opposite end 30, an outer surface and an interior wall each extending between the ends, the interior wall forming a central aperture extending between the sensing end and the opposite end of the body. A spacer means 25, 28 and 29 is attached to the outer surface of the body 24 and has a free end 26 extending beyond the sensing end of the body, the free end of the spacer means extending about less than an entire circumference of the sensing end of the body. An elongated tube 35 has a longitudinally extending aperture formed therethrough between a first end 36 and an opposite end, the tube extending through the central aperture and being attached to the interior wall of the body, the first end 36 being positioned adjacent to the sensing end 27 and the opposite end of the tube extending substantially beyond the opposite end of the body, the aperture in the tube having a cross-sectional area sufficient for providing a flow path for potting compound from the opposite end of the tube to the first end 36. Although the apparatus 22 is shown in the drawings as positioned in a generally horizontally extending cavity 20, the body 24 will sense forces applied in an axial direction parallel to the central aperture as well as forces applied in a radial direction. Thus, the apparatus 22 can be mounted in both horizontally and vertically extending cavities to sense axially and radially applied forces and is useful for sensing forces applied to any type of metalworking tool holder for monitoring coining, shearing, blanking and drawing operations in metal stamping presses; punch and die forces in coldforming and coldheading machines; and forces developed in secondary operations such as staking, assembly and riveting.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for measuring force applied to a metalworking tool holder comprising:
   a tubular body formed entirely of a piezoelectric material, said body having a first end and a second end, an outer surface and an interior wall each extending between said ends, said interior wall forming a central aperture extending between said ends of said body;
   spacer means attached to said outer surface of said body and having a free end extending beyond said sensing end of said body, said free end of said spacer means extending about a portion of an entire circumference of said first end of said body; and
   an elongated tube having an aperture formed therethrough between a first end and an opposite end, said tube extending through said central aperture of said body and being attached to said interior wall of said body, said first end of said tube being positioned adjacent said first end of said body and said opposite end of said tube extending substantially beyond said second end of said body, said aperture in said tube having a cross-sectional area sufficient for providing a flow path for a potting compound from said opposite end of said tube to said first end of said tube; and
   an electrical conductor connected to said body for generating a sensor output signal in response to a force applied to said body.

2. The apparatus according to claim 1 wherein said spacer means includes at least one leg attached to said outer surface of said body and having said free end extending beyond said first end of said body.

3. The apparatus according to claim 1 wherein said spacer means includes at least three legs spaced about said body.

4. The apparatus according to claim 3 wherein said legs each have an arcuate cross section which conforms to a curvature of said outer surface of said body.

5. The apparatus according to claim 1 including indicating means on an outer surface of said tube extending beyond said body for indicating a position of said body relative to the location of said indicating means on said tube.

6. The apparatus according to claim 5 wherein said indicating means is a decal adhered to said outer surface of said tube.

7. The apparatus according to claim 1 wherein said electrical conductor includes a two conductor electrical cable, a first end of one of said conductors electrically connected to said outer surface of said body and a first end of the other one of said conductors electrically connected to said interior wall of said body for generating said sensor output signal.

8. An apparatus for measuring force applied to a tooling holder comprising:
   a tubular body formed of a piezoelectric material and having a central aperture extending between a first end and a second end of said body, said tube having an outer surface and an interior wall forming said central aperture;
   spacer means attached to said outer surface of said body and having a free end extending beyond said first end of said body for spacing said body a predetermined distance from a bottom of a cavity;
   an elongated tube extending through said central aperture of said body, said tube having an outer surface and a first end terminating between said first end of said body and said free end of said spacer means and an opposite end extending beyond said second end of said body, said tube having an aperture formed therein with a cross-sectional area sufficient to permit a potting compound to flow from said opposite end of said tube to said first end of said tube;
   indicating means attached to said outer surface of said tube beyond said second end of said body for indicating a location of said body relative to the location of said indicating means on said tube; and
   an electrical conductor connected to said body for generating a sensor output signal in response to a force applied to said body.

9. The apparatus according to claim 8 wherein said spacer means includes at least one leg attached to said outer surface of said body and having said free end extending beyond said first end of said body.

10. The apparatus of claim 9 wherein said leg has an arcuate cross section which conforms to a curvature of said outer surface of said body.

11. The apparatus according to claim 8 wherein said free end of said spacer means extends along a portion of an entire circumference of said first end of said body for permitting potting compound to flow radially outwardly from said first end of said tube.

12. The apparatus according to claim 8 wherein said indicating means is a decal adhered to said outer surface of said tube.

13. The apparatus according to claim 8 located in a cavity formed in a tooling holder and including said potting compound encapsulating said body, said spacer means, said first end of said tube and an end of said electrical conductor connected to said body.

14. An apparatus for measuring force applied to a tooling holder comprising:

- a tubular body formed of a piezoelectric material and having an outer surface extending between a first end and a second end and an interior wall forming a central aperture extending between said first end and said second end, said body being located in a cavity formed in a tooling holder;
- spacer means attached to said outer surface of said body and having a free end extending beyond said first end of said body;
- an elongated tube extending through said central aperture in said body, said tube having a first end terminating between said first end of said body and said free end of said spacer means, an second end extending beyond said opposite end of said body and an aperture extending between said opposite end and said first end, said aperture in said tube having a cross-sectional area sufficient to permit flow of potting compound from said opposite end of said tube to said first end of said tube;
- indicating means attached to an outer surface of said tube beyond said second end of said body for indicating a position of said body relative to the location of said indicating means on said tube;
- an electrical cable having an end electrically connected to said body for generating a sensor output signal when force is applied to said body; and
- a potting compound extending through said aperture in said tube to said sensing end of said tube, said potting compound encapsulating said spacer means, said body, said sensing end of said tube and said end of said electrical cable whereby when a force is applied to the tooling holder, said sensor output signal is generated on said electrical cable.

15. The apparatus according to claim 14 wherein said spacer means extends about only a portion of a circumference of said first end of said body to permit radial flow of said potting compound from said central aperture into the cavity.

* * * * *